3,272,755
COMPOSITIONS OF POLYMERIC N-VINYL-ORGANIC COMPOUNDS AND PERCHLORIC ACID
Dimitry A. Shiraeff, Kutztown, Pa., assignor to General Aniline & Film Corporation, New York, N.Y., a corporation of Delaware
No Drawing. Filed Oct. 10, 1963, Ser. No. 315,338
8 Claims. (Cl. 252—187)

This invention relates to compositions containing polymeric vinyl organic compounds and perchloric acid, and more particularly to compositions containing polymeric N-vinyl heterocyclic compounds and perchloric acid having new and useful properties.

It is well known that perchloric acid is extremely unstable in the presence of organic materials. In "Dangerous Properties of Industrial Materials," N. Irving Sax (Reinhold Publishing Co., New York), at page 991, it is stated that perchlorates form explosive mixtures when they are mixed with carbonaceous materials and should be considered fire and explosive hazards when they are associated with these materials. The hazards of perchloric acid are described in greater detail in "A Comprehensive Treatise on Inorganic and Theoretical Chemistry," J. W. Mellor, vol. 2 (Longmans Green and Co., London, England), where on pages 379-80 it is stated that aqueous solutions of perchloric acid are much more stable than the anhydrous acid itself and that anhydrous perchloric acid acts as a powerful oxidizing agent on many substances. For example, if a drop of anhydrous perchloric acid is brought into contact with wood charcoal, an explosion which is almost as violent as that of nitrogen chloride occurs. The anhydrous acid will also spontaneously ignite paper or wood. Furthermore, the acid will sometimes explode when it is brought into contact with alcohol and will form a carbonacaous material when it is brought into contact with benzene.

It is an object of this invention to provide new and useful compositions containing perchloric acid and polymeric N-vinyl heterocyclic compounds. Another object of this invention is to provide methods for manufacture of compositions of polymeric N-vinyl heterocyclic compounds and perchloric acids. Other objects and advantages of this invention will become apparent as this description proceeds.

Contrary to the prior art, I have discovered that polymeric N-vinyl heterocyclic compounds such as polymeric N-vinyl lactams, polymeric N-vinyl oxazolidones, polymeric N-vinyl imidazoles and polymeric N-vinyl morpholones, copolymers and graft copolymers prepared from reaction of the monomers corresponding to the foregoing polymers with dissimilar vinyl monomers or polymers of the latter, form new and useful compositions with perchloric acid.

These compositions may be prepared by dissolving the polymeric N-vinyl heterocyclic compounds in aqueous perchloric acid having concentrations above 30% preferably above 60% and ranging up to anhydrous perchloric acid, and to 55% by weight of the desired polymeric N-vinyl heterocyclic compound whereby compositions are formed ranging from a clear solution to a stiff, stable clear gel. Alternatively, from about 1.6 to 30% by weight of perchloric acid can be added to an aqueous solution of the desired polymeric N-vinyl heterocyclic compound, whereby the polymeric N-vinyl heterocyclic compound—perchloric acid composition separates as a precipitate.

I have discovered that aqueous solutions of poly-N-vinylpyrrolidone form clear solution in aqueous perchloric acid wherein the concentration of the latter is below 1.6% by weight. At perchloric acid concentrations between 1.6 and 30% by weight, turbid solutions are obtained. At perchloric acid concentrations above 30% clear solutions were obtained. It is believed that complexes of polymeric N-vinyl heterocyclic compounds and perchloric acid are formed at least at perchloric acid concentrations above 1.6% but we prefer not to be limited to any particular theory as to the manner or mode in which this invention may operate.

Polymeric N-vinyl heterocyclic compounds which I have found useful in the practice of the present invention are illustrated by the following compounds: (a) polymeric N-vinyl lactams such as the polymers of N-vinyl-2-pyrrolidone, N-vinyl-2-piperidone and N-vinyl-2-caprolactam; (b) polymeric N-vinyl-2-oxazolidones; (c) polymeric N-vinyl-imidazoles; (d) polymeric N-vinyl-3-morpholones, and copolymers and graft copolymers prepared from the above N-vinyl-heterocyclic and dissimilar vinyl monomers such as vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2 ethylhexyl acrylate, hexyl acrylate, styrene, methoxystyrene, ethylstyrene, chlorostyrene or the like.

N-vinyl heterocyclic compounds of the type described above and their polymers are well known in the art and methods for their production may be found in patents and other literature. For example, U.S. Patent 2,317,804 discloses a suitable method for preparing N-vinyl lactams. U.S. Patents 2,265,450 and 2,335,454 disclose methods for preparing water-soluble polymers of N-vinyl lactams and their solutions. A method for the preparation of polymeric N-vinyl-2-oxazolidone is given in U.S. Patent 2,987,505.

Homopolymers, random type copolymers and graft copolymers of the above described types having molecular weights from about 1,000 to 500,000 are preferred in the practice of this invention. Generally, I prefer to use polyvinylpyrrolidone having molecular weights of from about 300,000 to 400,000. For some applications it may be advantageous to use mixtures of the above described polymeric materials having different molecular weight ranges.

When copolymers are used, the weight ratio of the component N-vinyl heterocyclic monomer to that of the dissimilar vinyl monomer in the copolymer will determine its properties. Choice of the weight ratio will depend on the particular properties desired in the copolymer. Preferred weight ratios of N-vinyl heterocyclic monomer to dissimilar vinyl monomers include ratios from 40:60 upward.

The following examples illustrate compositions of polymeric N-vinyl heterocyclic compounds and perchloric acid as well as the methods by which they were produced. These examples are to be regarded only as illustrative of the present invention and are not to be considered as limitative. It will be understood that all parts, proportions and percentages referred to herein and in the appended claims are by weight unless otherwise indicated.

*Example 1*

50 parts of poly-N-vinylpyrrolidone obtained by the polymerization of N-vinyl-2-pyrrolidone and having a molecular weight of 360,000 was added in small portions with stirring and cooling to 50 parts of 70% perchloric acid in a reactor equipped with an agitator, a thermometer and provisions for cooling. The temperature was maintained at 10° to 20° C. throughout the addition. Since considerable heat is evolved during the addition of polyvinylpyrrolidone to perchloric acid, proper precautions to provide for adequate cooling and stirring during the process were taken to avoid discoloration or explosive decomposition of the composition. As the concentration of polyvinylpyrrolidone in the mixture increased, the viscosity of the solution increased. A stiff, clear stable gel was obtained at a polyvinylpyrrolidone concentration of 45% based on the total weight of the solution. A stiff gel which was so viscous that the composition could not be satisfactorily agitated was obtained at a polyvinylpyrrolidone concentration of 50% and further polyvinylpyrrolidone additions were discontinued. The 50% polyvinylpyrrolidone gel was colorless. It was found to be stable toward sunlight and moderate heating (temperatures up to 40° C.). This gel burned with a colorless flame when it was exposed to an open flame. It was found that the rate of burning of the gel could be increased by warming the gel. The gel was found to have satisfactory storage stability properties at room temperature.

*Example 2*

Poly-N-vinylpyrrolidone having a molecular weight of 360,000 was added in small quantities with stirring to 50 parts of 30% perchloric acid in the same reactor and under the conditions used in Example 1. A clear, stiff stable gel was formed at a polyvinylpyrrolidone concentration of 45%. This gel was found to have similar sunlight stability, heat stability, storage stability and burning properties to those of the gel prepared with 70% perchloric acid.

*Example 3*

Polyvinylpyrrolidone having a molecular weight of 360,000 was added in small quantities with stirring and cooling to 50 parts of 100% perchloric acid in the same reactor and under the same conditions as described in Example 1. A clear stable gel having properties similar to those in Example 1 was obtained at a polyvinylpyrrolidone concentration of 45% by weight.

*Example 4*

An aqueous solution containing 1% of polyvinylpyrrolidone (by weight) was prepared and sufficient 70% perchloric acid was added with agitation while the temperature was maintained at 10 to 20° C. to obtain a perchloric acid concentration of 1.6% by weight. It was found that a mixture of polyvinylpyrrolidone-perchloric acid began to separate out of the solution in the form of highly dispersed particles at a perchloric acid concentration of 1.6%. The particles were well dispersed and did not settle for several hours. The effect of varying concentrations of perchloric acid on the polyvinylpyrrolidone solution was then investigated. It was found that polyvinylpyrrolidone would separate from this solution whenever sufficient perchloric acid was added to give concentrations of perchloric acid in the range of 1.6 to 30% by weight.

Similar solutions were prepared containing 0.05, 0.1 and 10% polyvinylpyrrolidone, and treated with perchloric acid in the manner described above. Comparable results were obtained with all of these solutions at perchloric acid concentrations in the range of 1.6 to 30% by weight.

Other polymeric N-vinyl heterocyclic compounds may be used in the above examples instead of polyvinylpyrrolidone. Such materials include poly-N-vinyl-2-oxazolidone, poly-N-vinyl imidazole, poly-N-vinyl-3-morpholones, copolymers of N-vinyl-2-pyrrolidone and vinyl acetate, copolymers of N-vinyl-2-pyrrolidone and styrene, copolymers of N-vinyl-2-pyrrolidone and vinyl chloride, copolymers of N-vinyl-2-pyrrolidone and methyl vinyl ether or the like. It is to be understood that monomers of other N-vinyl lactams, N-vinyl oxazolidones, N-vinyl imidazoles, N-vinyl morpholones, or the like may be used in the preparation of the above copolymers. The above described copolymers may be random type copolymers, graft copolymers or the like.

The above described compositions are of interest where localized oxidation treatment may be required. For example, the compositions may be applied to the surface of wood, fabrics, metals (e.g. copper or brass) or the like for bleaching or for production of an oxidized surface. The composition may be applied with or without dilution. The compositions are also useful in industrial processes wherein localized oxidation, localized acidization or other localized treatment is required or desired, such as in processes for the bleaching of wood, discharge of dyed fabrics, oxidation of metals (e.g. copper or brass), acid etching of metals or the like.

This invention has been disclosed with respect to certain preferred embodiments and various modifications and variations thereof will become obvious to persons skilled in the art. It is to be understood that such modifications and variations are to be included within the spirit and scope of the present invention.

What is claimed is:

1. A stable aqueous gel of perchloric acid consisting essentially of perchloric acid of at least about 30% concentration in combination with a polymeric N-vinyl heterocyclic compound selected from the group consisting of polymers of N-vinyl lactams, polymeric N-vinyl oxazolidones, polymeric N-vinyl imidazoles, polymeric N-vinyl morpholones and copolymers thereof with dissimilar vinyl monomers, said polymeric N-vinyl heterocyclic compound constituting from 45 to 55% by weight of said gel.

2. The composition as defined in claim 1 wherein the polymeric N-vinyl heterocyclic compound specified is a copolymer of an N-vinyl heterocyclic monomer of the group specified wherein the dissimilar vinyl monomer is selected from the group consisting of vinyl acetate, isopropenyl acetate, vinyl laurate, vinyl stearate, vinyl oleate, vinyl benzoate, vinyl chloride, 2-chloropropene, methyl vinyl ether, ethyl vinyl ether, isopropyl vinyl ether, isobutyl vinyl ether, 2-oxyethyl vinyl ether, phenyl vinyl ether, methyl acrylate, ethyl acrylate, methyl methacrylate, 2-ethylhexyl acrylate, hexyl acrylate, styrene, methoxystyrene, ethylstyrene and chlorostyrene.

3. The composition as defined in claim 1 wherein the polymeric N-vinyl heterocyclic compound specified is poly N-vinyl-2-pyrrolidone.

4. The composition as defined in claim 3 wherein the perchloric acid specified has a concentration of at least 60%.

5. The composition as defined in claim 4 containing 10 parts of perchloric acid having a concentration of 60 to 50 and 8 to 11 parts of poly vinyl pyrrolidone.

6. The method of stabilizing perchloric acid which comprises admixing perchloric acid having a concentration of at least 1.6% by weight with a polymeric N-vinyl heterocyclic compound selected from the group consisting of polymers of N-vinyl lactams, polymeric N-vinyl oxazolidones, polymeric N-vinyl imidazoles, polymeric N-vinyl morpholones and copolymers thereof with dissimilar vinyl monomers.

7. The method as defined in claim 6 wherein an aqueous solution of the polymeric N-vinyl heterocyclic compound is admixed with perchloric acid in such amounts as to yield a perchloric acid concentration of 1.3 to 35% by weight, and the resulting percipitate of polymeric N-vinyl heterocyclic compound and perchloric acid is separated from the reaction mixture.

8. The method as defined in claim 6 wherein the polymeric N-vinyl heterocyclic compound specified is poly-N-vinyl-2-pyrrolidone and an aqueous solution thereof is admixed with perchloric acid in such amounts as to yield an acid concentration of at least 30% and containing from 45 to 55% by weight of poly-N-vinyl-2-pyrrolidone, whereby a clear stable gel is produced.

References Cited by the Examiner
UNITED STATES PATENTS

| | | | |
|---|---|---|---|
| 2,460,195 | 1/1949 | Segall | 260—88.3 |
| 2,826,558 | 3/1958 | Binder | 260—29.6 |

MURRAY TILLMAN, *Primary Examiner.*

SAMUEL H. BLECH, *Examiner.*

W. J. BRIGGS, Sr., *Assistant Examiner.*